July 27, 1965   J. L. LINDBERG   3,197,240
SAFETY DEVICE
Filed Jan. 24, 1963
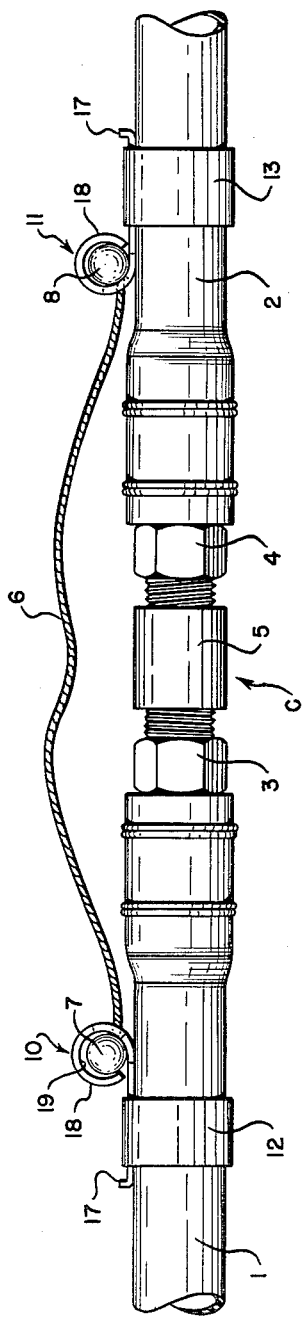
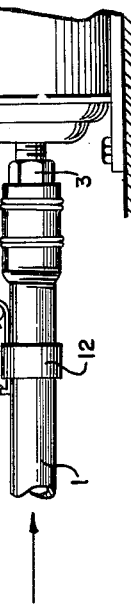
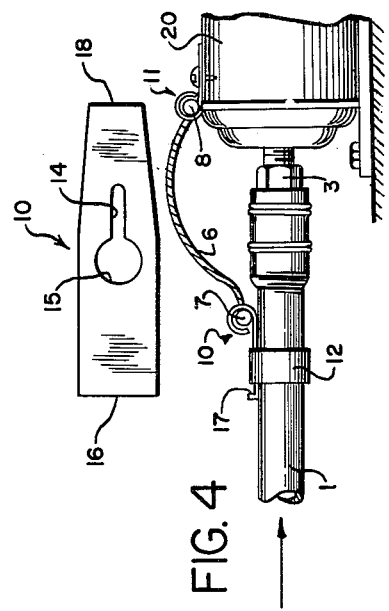
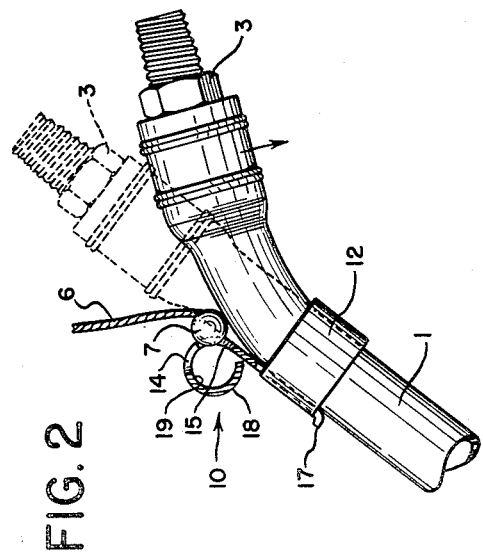
INVENTOR
Jerome L. Lindberg
BY Pennie, Edmonds,
Morton, Taylor & Adams
ATTORNEYS

United States Patent Office 3,197,240
Patented July 27, 1965

3,197,240
SAFETY DEVICE
Jerome L. Lindberg, Pueblo, Colo., assignor to The Colorado Fuel and Iron Corporation, Denver, Colo., a corporation of Colorado
Filed Jan. 24, 1963, Ser. No. 253,696
2 Claims. (Cl. 285—114)

This invention relates to high pressure hose couplings and to safety means for preventing an end of the hose from whipping when the hose becomes disconnected while under the high pressure of fluids (gas, air, water, oil, etc.). The violent whipping of a disconnected high-pressure hose is a dangerous condition and a frequent cause of injury to workmen. It is an object of this invention to provide a safety coupling for flexible hose connections which is foolproof, inexpensive, easy to install and operate.

The invention provides an improved safety device for connection to flexible high-pressure hose where the hose is coupled to other hose or to other objects to hold the high-pressure end of the hose and prevent it from whipping when disconnected. The safety device of the invention comprises a flexible cable one end of which is detachably connected to the exterior of the hose near the coupling and the other end is detachably connected to the object, for example a hose, pipe or machine, to which the high-pressure hose is connected by a coupling. The cable bridges the coupling and has sufficient slack to permit ease of assembly and disassembly but will tend to prevent accidental uncoupling of the hose connection, for example, a threaded connection, a union or other means.

In a preferred embodiment, the cable has a terminal enlargement, preferably a ball, on at least one end, and the hose end which is under high pressure and subject to whipping when free is provided with a means to engage the ball to effect a detachable but secured connection. The cable may have a ball or equivalent enlargement, such as a tee head, on each end for rapid connection and removal of the cable. It is advantageous to provide on the hose near the coupling a clip which is clamped to the hose having means for receiving and removing the ball. In a preferred embodiment of the invention the coupling clip has a recess for receiving the enlargement into which the enlargement can be entered or removed only by bending the hose.

Herein for convenience I have referred to a cable; it will be understood that any flexible tension member such as a rope, rubber band, or chain may be used for the same purpose and the word "cable" is intended to cover these as equivalents.

The accompanying drawings illustrate an embodiment of the invention in which

FIG. 1 is a side view of the invention applied to the coupling of one hose to another;

FIG. 2 is a side view of a hose coupling as in FIG. 1 illustrating the manner of connection or disconnection;

FIG. 3 is a plan view of the clip when flat and before bending it to the shape of FIGS. 1 and 2; and, FIG. 4 is a side view of the invention applied to the coupling of a hose to an air operated tool.

The coupling illustrated in FIG. 1 comprises the terminals of high-pressure hoses 1 and 2 which are securely connected to threaded coupling members 3 and 4 respectively of the coupling member C. A conventional coupling member of this type includes a collar 5 having threads for engaging threads on the members 3 and 4. Any other suitable type of coupling may be used.

Obviously if the coupling be accidentally broken or disconnected or if the hose 1 should pull free of coupling member 3, only the hose, for example 1, connected to the high-pressure fluid will be dangerous and require securing. If the coupling be connected to a tool or apparatus such as a drill, motor or other apparatus, the hose 2 might be unnecessary and the coupling will be connected directly to the tool or apparatus, such as that indicated by reference numeral 20 in FIG. 4. In this case it will be only the hose 1 which will be secured by the device of the invention to the apparatus.

The cable 6 has secured to the ends an enlargement such as a metal ball 7 and 8. This enlargement may take various forms for detachable connection to the hose. Near the coupling end of each hose an attachment member in the form of a retainer clip 10 and 11 is secured to the hose by a clamping member 12 and 13 such as a metal band or a wrapping of wire or reinforced plastic tape. The retainer clips may be formed from flat plate shown in FIG. 3 which are punched out to form a slot 14 contiguous with the enlarged opening 15. The end 16 is turned up to form the stop 17 and the end 18 is bent into a cylinder to form a pocket 19 for the entry of the ball 7.

As shown in FIG. 1 the balls 7 and 8 are actually secured in the pockets and cannot be accidentally displaced. FIG. 2 shows the manner of connecting the cable balls 7 and 8 to the clips 10 and 11 respectively. The hose is bent to expose the opening 15 so that the ball can be pushed into the space 19. When the hose becomes straight as in FIG. 1 the opening 15 is closed by the hose and the ball cannot be displaced. In this position, the cable enters slot 14 and this secures the cable and ball in position to hold hoses 1 and 2 together should the coupling C become disconnected.

In FIG. 4, the high pressure hose 1 is coupled to a pressure fluid apparatus 20 which is mounted in fixed position on a base as illustrated. If the coupling to this apparatus should break, the end of hose 1 might be subjected to whipping, and would be restrained by the cable 6. In this instance, after the supply of high pressure fluid to hose 1 has been cut off, the ball 11 could be released from retainer clip 10 in the manner above described, and could be re-applied in a similar manner. The ball 8 however, on the opposite end of cable 6 would be permanently secured to clip 11 inasmuch as this clip would be mounted in position on the apparatus 20 by means of the screw illustrated, or otherwise.

I claim:
1. A safety device for preventing the high pressure end of a sectionalized conduit from whipping upon severance of the connection between said sections which comprises, in combination, two sections of high pressure conduit, the high pressure end section being a flexible hose, a releasable coupling for securing said sections together at adjacent ends thereof, an attachment member to each section near the coupling end thereof and including a band encircling the section and a clip extending longitudinally thereof, said clip having a keyhole shaped slot formed therein, a cable having a length slightly greater than the distance between said attachment members when the sec- tions are coupled, said cable having a knob at each end of a size to enter the enlarged portion of the keyhole slot but to be retained by the narrow portion of the slot, that section of said clip containing the enlarged portion of said keyhole slot lying in contiguous relation to said hose when the hose is straight and being disposed adjacent said band but removed therefrom a distance sufficient to expose same for entry of said knob into the enlarged portion when the hose is bent, whereby said cable is secured against removal from the hose by the hose closing the opening during normal use of the device.

2. A safety device as set forth in claim 1 wherein one end of the cable is secured to a fixed object and wherein the attachment member has a cylindrical pocket with which the keyhole shaped slot is associated, the direction of the passageway through this slot being at right angles to the axis of the cylindrical pocket.

References Cited by the Examiner
UNITED STATES PATENTS

| | | | |
|---|---|---|---|
| 1,558,878 | 10/25 | Hitchcock | 285—114 |
| 2,574,579 | 11/51 | McCoy | 24—123.1 |
| 2,637,591 | 5/53 | Maxfield | 24—123.1 |

CARL W. TOMLIN, *Primary Examiner.*